United States Patent [19]

Muckle et al.

[11] Patent Number: 5,603,077
[45] Date of Patent: Feb. 11, 1997

[54] SATELLITE SYSTEM AND METHOD FOR REMOTE CONTROL OF A SATELLITE SIGNAL RECEIVER

[75] Inventors: Thomas A. Muckle, Fremont; Gregory D. Gudorf, Pleasanton; John O. Bumgarner, Morgan Hill, all of Calif.

[73] Assignee: Chaparral Communications, Inc., San Jose, Calif.

[21] Appl. No.: 358,720

[22] Filed: Dec. 19, 1994

[51] Int. Cl.⁶ .............................. H04B 1/16; H04H 1/00
[52] U.S. Cl. .......................... 455/3.2; 455/6.3; 455/12.1; 455/70
[58] Field of Search .................. 455/3.2, 4.1, 6.3, 455/12.1, 70, 71

[56] References Cited

U.S. PATENT DOCUMENTS 4,605,973  8/1986  Von Kohorn .......................... 455/6.3
4,866,787  9/1989  Olesen ................................. 455/3.2
5,371,795  12/1994  Vogel ................................. 455/4.1

Primary Examiner—Chi H. Pham
Attorney, Agent, or Firm—Thomas E. Schatzel; Law Offices of Thomas E. Schatzel A Prof. Corporation

[57] ABSTRACT

A satellite broadcast system using an airwave message signal to remotely control a signal receiver. The system includes a system manager to issue a message, a message service to broadcast the message in the airwave message signal, and a signal receiver to select a satellite and a channel of a downlink signal from the satellite carrying a desired program. The program may include audio/video, text, pictures, software, or data. In the preferred embodiment, the message service is a pager service.

4 Claims, 2 Drawing Sheets

SATELLITE BROADCAST SYSTEM 10

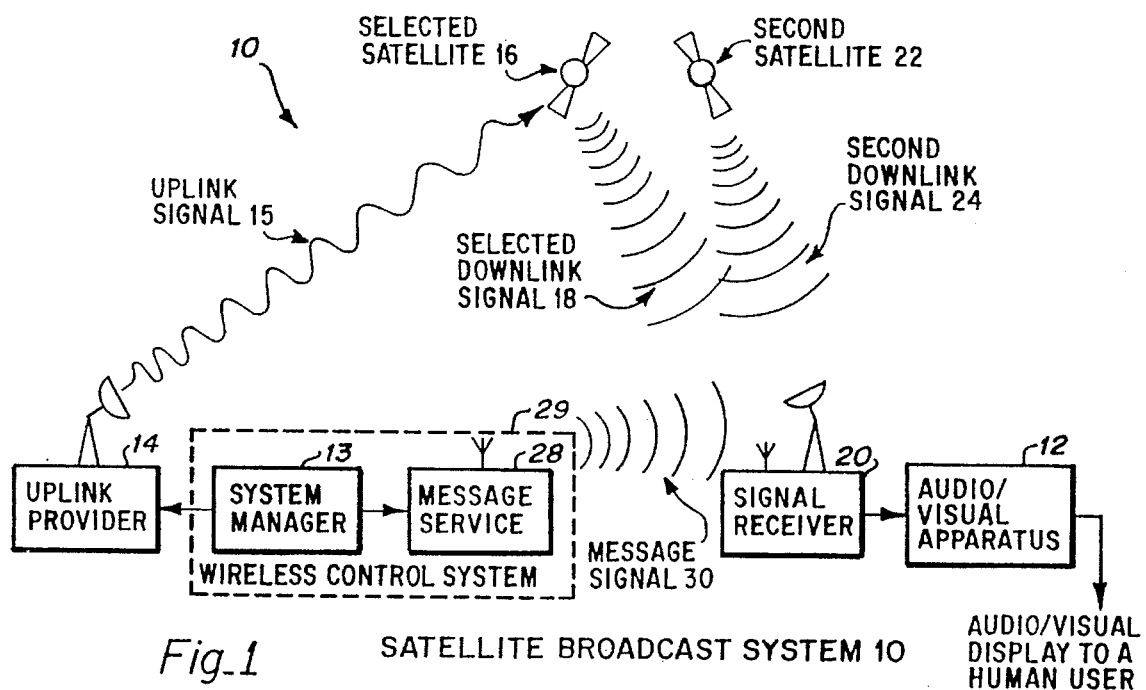
Fig_1  SATELLITE BROADCAST SYSTEM 10
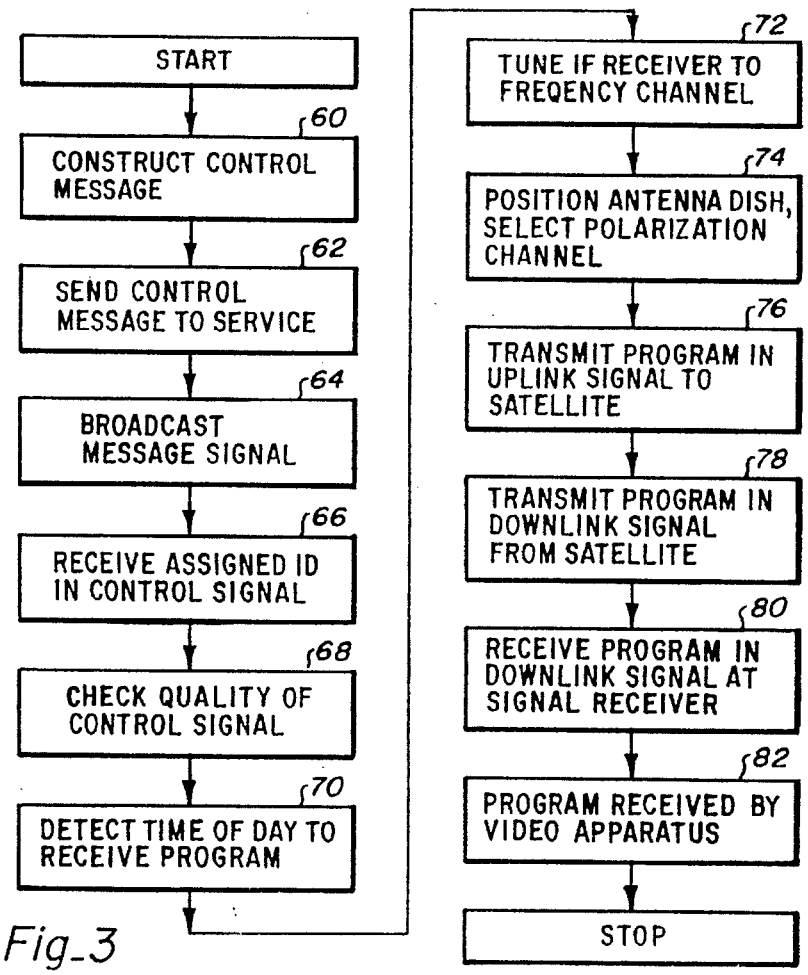
Fig_3

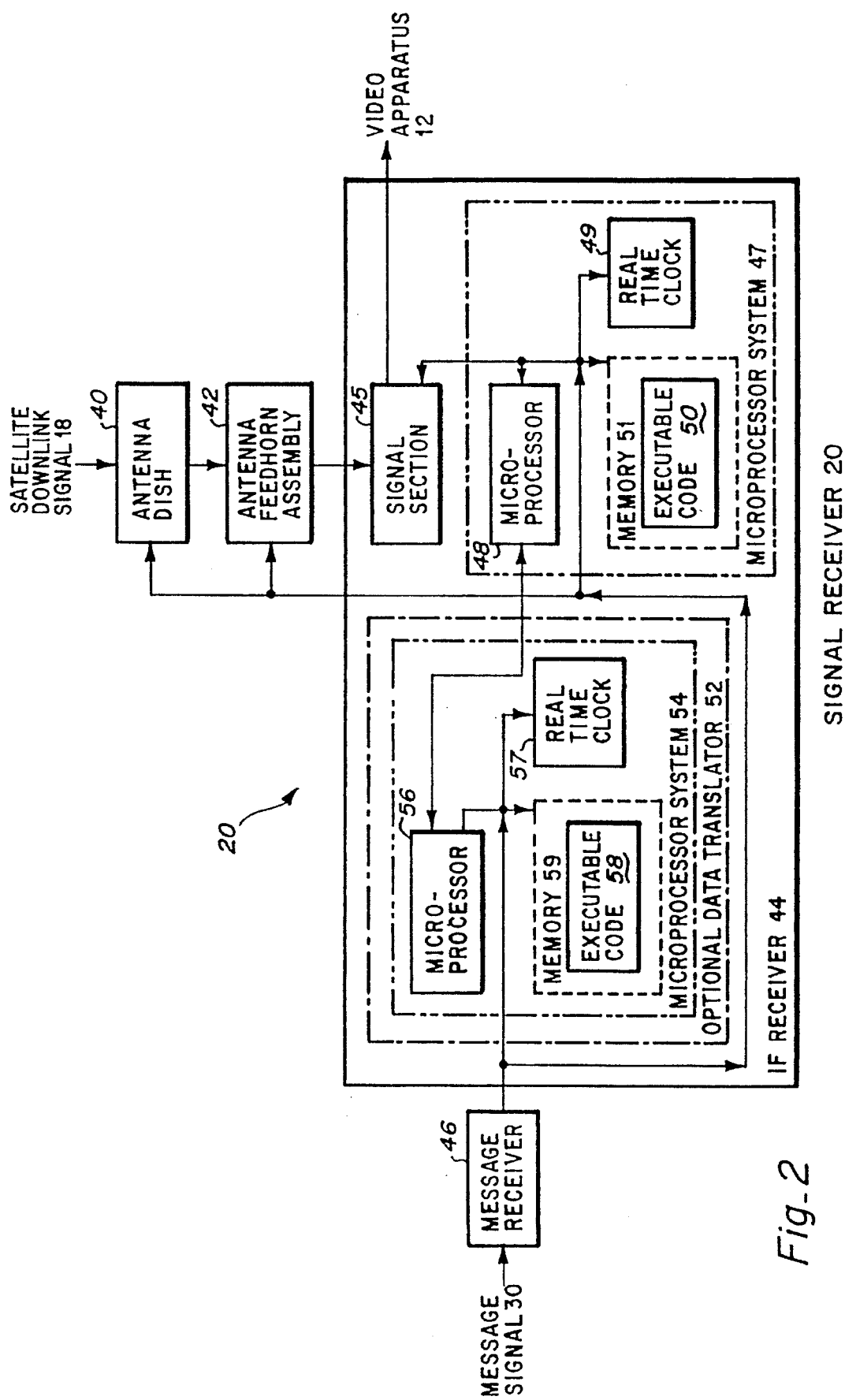

SATELLITE SYSTEM AND METHOD FOR REMOTE CONTROL OF A SATELLITE SIGNAL RECEIVER

BACKGROUND OF THE INVENTION

1. Field of the Invention:

The invention relates generally to signal receivers and more particularly to a system and a method for a satellite receiver to receive a downlink signal from a satellite and to receive a control message from a source other than the downlink signal.

2. Description of the Prior Art:

A geostationary satellite system is commonly used to send a program of audio/video or data from one sending location to many receiving locations. An important benefit of the satellite system is the ability to send the program to remote locations that are not wired to telephone lines. The satellite system includes a system manager on Earth to select the program, a satellite in space to receive the program in an uplink signal and to re-transmit the program in a downlink signal to one or more signal receivers on Earth. Many system managers simultaneously send multiple programs using many satellites. The signal receiver includes an antenna to select the satellite transmitting the desired program by positioning the antenna in a desired elevation and azimuth relative to the desired satellite. In order to allow the signal receiver to further distinguish the desired program, the downlink signals are divided into channels by frequency, time, polarization and modulation. The signal receiver selects the channel of the downlink signal having the desired program.

One application of the satellite system is "distant learning". In distant learning a live or recorded audio/video program is sent from the system manager simultaneously to many signal receivers with each receiver being located in a classroom. Such classrooms may be distinctly located in various different locations. Conceptual proposals having as many as 2,000 classrooms in a system have been made. A problem in distant learning and use of existing satellite systems is that the signal receiver may become tuned to a channel other than the channel used for the distant learning event. This occurs because multiple satellites having multiple downlink signal channels are used in the application or because the receiver is used to receive other programs during time periods used for the distant learning application. Satellite and channel changing is a common occurrence in signal receivers in classrooms due to multiple uses of the receiver during evenings and weekends by teachers and coaches for various other purposes. The channel used in the application cannot be used to carry message information to re-tune the receiver because the receiver is not receiving that channel. Typically, an experienced operator is then required to re-tune the receiver to the correct satellite and channel for the distance learning program. One method of eliminating the requirement of the experienced operator is by controlling the signal receiver with a message sent over the telephone system to a telephone modem that is located with the receiver. However, a limitation of the use of the telephone system to control multiple sites and to send the message to all sites is that many telephone calls may need to be made approximately simultaneously to send the message to all sites. A further limitation is that a telephone line must be installed adjacent to the signal receiver. The requirement for the telephone line may eliminate the benefit of the satellite system of being capable of sending information to a remote location. Further, some sites, such as the classrooms in some school districts, impose a level of bureaucracy that makes the installation of a telephone line impractical.

There is a need for a signal receiver capable of receiving a plurality of satellite downlink channels carrying programs for audio/video or data and of receiving an airwave message signal, from a source other than the received channel, to properly prepare the receiver for selecting the correct satellite downlink channel having the desired program. There is a further need for a wireless control system to broadcast the airwave message signal to many signal receivers simultaneously.

SUMMARY OF THE PRESENT INVENTION

It is therefore an object of the present invention to provide a signal receiver capable of receiving a plurality of satellite downlink channels carrying programs and of receiving an airwave message signal, from a source other than the received channel, to properly prepare the receiver for selecting the correct satellite downlink channel.

Another object is to provide a system capable of broadcasting the message signal in the form of an airwave signal to many signal receivers simultaneously.

Another object is to provide a system capable of broadcasting the message signal using a pager service.

Another object is to provide a signal receiver capable of monitoring statistics for the integrity, reliability and latency of the message signal.

Briefly, a preferred embodiment of the present invention includes a system manager to select a program to be broadcast and to provide a message for the selection of a satellite and a channel to carry the program, the selected satellite to receive the program in an uplink signal and to re-transmit the program in the selected channel, a message service to receive the message from the system manager and to broadcast the message in an airwave message signal, a signal receiver to receive the message signal and to tune to the selected satellite downlink channel, and a audio/video apparatus to provide the program for the benefit of a human user. The signal receiver includes an antenna to receive the satellite downlink signal and to issue an intermediate frequency (IF) signal, an IF receiver to receive the IF signal and to provide the program in an electrical output signal, and a message receiver to receive the message signal and provide an electrical control signal to tune the signal receiver to the selected satellite and channel. The message service in the preferred embodiment is a pager Service. An executable code in the signal receiver tracks the integrity, reliability, and latency of the message signal.

An advantage of the present invention is that it provides for a signal receiver that can be remotely controlled to select a satellite and a channel carrying a desired program by receiving a message source other than the channel carrying the program.

Another advantage of the present invention is that it provides for control of a signal receiver by an airwave signal that is broadcast.

Another advantage of the present invention is that it provides for a system wherein a broadcast message signal can control a plurality of signal receivers simultaneously.

Another advantage of the present invention is that the message signal can be broadcast by using a pager service or/and other wireless service.

Another advantage of the present invention is that it provides for a signal receiver capable of monitoring statistics for the integrity, reliability and latency of the message signal.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a general view of a satellite system providing a broadcast message signal for the remote control of a signal receiver;

FIG. 2 is a block diagram of the signal receiver of FIG. 1; and

FIG. 3 is a flow chart of a method in the system of FIG. 1 to control the signal receiver of FIGS. 1 and 2 to select a satellite and a channel.

DETAILED DESCRIPTION OF THE PREFERRED EMBODIMENT

FIG. 1 illustrates a satellite broadcast system of the present invention and referred to by the general reference number 10. The system 10 is adapted for sending a program to an audio/video apparatus 12 located at a remote site. The program can include audio/video, text, pictures, software code, electronic mail, or/and data. Typically, the audio/video apparatus 12 is a VCR or a television to display the received program to a human user or a computer to receive the software code, electronic mail, or data. Many audio/video apparatus 12 at multiple remote sites may receive the program approximately simultaneously. An application of the system 10 is sending recorded or live audio/video programming to school classrooms for "distant learning" or to businesses for promotions or communication meetings. Another application is sending code or/and data to be used in a remote computer. The system 10 includes a system manager 13 to select the program and to communicate the selection to an uplink provider 14. The telephone system, a radio, the postal service, or an equivalent can be used for this communication. The uplink provider 14 transmits the program in an airwave uplink signal 15. In some instances, the system manager 13 and the uplink manager 14 are combined. A selected satellite 16 receives the airwave uplink signal 15 and issues a selected airwave downlink signal 18 to a signal receiver 20. The signal receiver 20 receives the selected downlink signal 18 and provides the program in an electrical signal to the audio/video apparatus 12. A plurality of satellites in space, as illustrated by a second satellite 22, issue additional downlink signals, as illustrated by a second downlink signal 24. The selected downlink signal 18 includes one or more channels divided by signal frequency and signal polarization.

The system manager 13 constructs a message to select the satellite 16; to select the channel of the downlink signal 18; and to designate a time of day, including a date, to tune the signal receiver 20 to the selections. The manager 13 communicates the message over a commercial or private telephone, a radio, or an equivalent to a message service 28, such as that referred to commercially as MobileComm. Various message services 28 are available in the United States, Europe, and the rest of the world. In the United States, the availability of the message service 28 in a given geographical area is commonly advertised in the yellow pages of a telephone book under "paging." The system manager 13 and the message service 28 form a wireless control system 29. The message service 28 broadcasts the selection message in the form of an airwave message signal 30. The airwave message signal 30 may be received by many message receivers within range. One analogous use of the message signal 30 is to page a human user of a pager receiver with instructions to return a telephone call to a telephone number that is included in the message. Typically, the pager receiver is assigned a unique pager identification (ID) to enable each pager receiver to distinguish a message intended for that pager receiver from messages intended for other pager receivers. The signal receiver 20 receives the message signal 30, recognizes an assigned ID, and tunes to the selected satellite 16 and the selected downlink is signal 18 channel at the time of day designated in the message. Each signal receiver 20 in the system 10 can have an identical ID to enable the system manager 13 to control all of the signal receivers 20 with a single message signal 30. Alternatively, a hierarchy of IDs up to at least four levels can be included in the message so that the signal receiver 20 can process none or a portion of the message. A list of the messages currently supported by the preferred embodiment is included in a *Monterey Satellite Television Receiver model 100C Data Translator User's Manual*, pages 17 to 42, published by Chaparral Communications located at 2450 North First St., San Jose, Calif., 95131-1195 in 1991 incorporated herein by reference.

FIG. 2 illustrates a block diagram of the signal receiver 20 according to the present invention. The signal receiver 20 includes an antenna dish 40, such as a Channelmaster Mirage X, an Orbitron SX10, or a Wineguard Quadstar, to focus the energy of the selected downlink signal 18 to an antenna feedhorn assembly 42. The antenna feedhorn assembly 42 includes a feedhorn, such as a Chaparral Corotor II Plus, and an LNB amplifier/downconverter, such as a Chaparral Sidekick II. The antenna dish 40 is controlled by an electronic dish control signal to properly position the dish 40 at an elevation and at an azimuth to select the satellite 16. The antenna feedhorn assembly 42 receives an electronic feedhorn control signal to select a phase to receive a vertical or a horizontal polarization channel of the selected downlink signal 18. The antenna feedhorn assembly 42 downconverts the frequency of the selected downlink signal 18, typically in the range of approximately 3.7 GHz to 4.2 GHz in C-band or in the range of approximately 11.7 GHz to 12.7 GHz in Ku-band, to an intermediate frequency (IF) and issues an IF signal to an IF receiver means 44. The construction of the IF receiver means 44 depends upon several signal parameters. An analog construction is used where modulation of the selected downlink signal 18 is frequency modulation. A digital construction, such as an integrated receiver decoder (IRD), is used where the downlink signal 18 modulation is digital, such as quadrature phase shift key (QPSK). The construction of the IF receiver means 44 further depends upon the type of signal used for the program information, such as analog television, digital television, and digital data. The IF receiver means 44 includes a signal section 45 to receive the IF signal and to provide an audio/video signal or a data signal to the audio/video apparatus 12.

A message receiver 46 receives the message signal 30 as broadcast by the message service 28. The message receiver 46 in the embodiment may be in the form of a pager receiver, such as a Motorola NEWSTREAM model, a Motorola RNet model manufactured by Motorola, or is assembled from components such as an SL6609/MV6639 chipset manufactured by GEC Plessey with an SPM28C51M EEPROM manufactured by Seiko/Epson or an SL6609/MV6640 chipset manufactured by Plessey with any one of many standard commercial EEPROMs. A schematic note is available from Plessey with instructions for the assembly of the pager receiver using the Plessey chipsets. The message receiver 46 checks the message signal 30 for the ID that has been assigned to the signal receiver 20 and issues the message in an electronic control signal when the ID is recognized.

The IF receiver means 44 includes a microprocessor system 47 including a microprocessor 48, a real time clock 49, and an executable code 50 including instructions stored in a memory 51. The message receiver 46 passes the message to the IF receiver means 44. In a first variation for the preferred embodiment where the IF receiver means 44 includes a Chaparral model 200C, the microprocessor 48 executes instructions in the executable code 50 in a conventional manner to control the elements of the signal receiver 20 and to check the quality of the message. When the quality is satisfactory, the IF receiver means 44 issues the dish control signal, issues the feedhorn control signal, and tunes to the selected frequency channel of the IF signal. In a second variation of the preferred embodiment where the IF receiver means 44 includes a Chaparral model 100C, the message receiver 46 passes the message to a data translator 52, such as a Chaparral Data Translator. The data translator 52 includes a microprocessor system 54 including a microprocessor 56, a real time clock 57, and an executable code 58 including instructions stored in a memory 59. The microprocessor 56 executes instructions in the executable code 58 in a conventional manner to check the quality of the message and to convert an eight bit ASCII protocol in the electronic control signal from the message receiver 46 to a nine bit protocol used by the model 100C IF receiver means 44. The IF receiver means 44 in the preferred embodiment provides and accepts digital signals as described in the *Monterey Satellite Television Receiver model 100C Data Translator User's Manual* referred to above.

FIG. 3 illustrates a flow chart of the steps of a method for controlling the signal receiver 20 with the airwave message signal 30. In a step 60, the system manager 13 constructs a message which includes the ID assigned to the signal receiver 20, message information to select the selected satellite 16, to select the selected downlink signal 18 channel, and to designate the time of day, including the date, when a program is to be received. Typically, one or more duplicate messages are sent. Optionally, the message includes the following information to be used to measure message quality: (i) information of whether the message is a duplicate, and if so, a duplicate number of the message, (ii) information for error detection or/and error correction, and (iii) information for a time of day that the message is sent to the message service. In a step 62 the system manager 13 transmits the message to the message service 28. The message may be transmitted to the message service using a commercial or private telephone, radio, or an equivalent. In a step 64, the message service 28 broadcasts the message in the airwave message signal 30. In a step 66, the message receiver 46 receives and recognizes the assigned ID and issues the message in the electronic control signal. In a step 68, the quality of the message is checked for integrity, reliability, and latency. The operation of step 68 is described for the elements of the first variation and for the elements of the second variation enclosed in parentheses. The microprocessor 48 (56) executes instructions in the executable code 50 (58) to check the message against the included error detection or/and error correction information. When an error is detected, an integrity score is incremented. When error correction information is included, the microprocessor 48 (56) executes further instructions in the executable code 50 (58) to attempt to correct the message. If the message can be corrected, it is used. The microprocessor 48 (56) executes further instructions in the executable code 50 (58) to ignore a duplicate message that has already been received and to increment a reliability score when a duplicate message is not received. The microprocessor 48 (56) executes further instructions in the executable code 50 (58) to compare the time of day, including the date that the message is sent, to the time of day provided by the real time clock 49 (57) and to maintain a latency file of the comparisons. The integrity score, the reliability score, and latency file are stored in memory 51 (59) to be available for analysis at a later time.

In a step 70, the signal receiver 20 detects when the actual time has reached the designated time of day for the program to be received. In a step 72, the IF receiver means 44 tunes to an IF frequency channel representing the selected frequency channel of the downlink signal 18, issues the electronic dish control signal which in turn causes the antenna dish 40 to aim toward the satellite 16, and issues the electronic feedhorn control signal to select the phase of the antenna feedhorn assembly 42 for the selected polarity channel of the downlink signal 18. In a step 74 the dish 40 executes the control information in the dish control signal thereby aiming the elevation and azimuth toward the satellite 16 and the feedhorn assembly 42 executes the control information in the feedhorn control signal to select the polarity channel of the downlink signal 18. Steps 72 and 74 are performed at approximately the same time. In a step 76, the uplink provider 13 transmits the program to the selected satellite 16 in the uplink signal 15. In a step 78, the selected satellite 16 transmits the selected downlink signal 18 to a geographical area on Earth that includes the location of the signal receiver 20. In a step 80, the signal receiver 20 receives the selected downlink signal 18 and issues the program to the audio/video apparatus 12 for observation in a step 82.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved satellite broadcast system including a program source that uplinks programs to a plurality of orbiting satellites, which, in turn, downlink the programs to a plurality of earth receiving stations, wherein each earth receiving station includes a satellite receiving antenna dish for receiving said downlink programs and having position controls for azimuth and elevation that provide for the selection of a particular orbiting satellite and a feedhorn able to receive control signals to select the phase of the antenna feedhorn for their selected polarity channel of a particular downlink signal, and each receiving station further includes a satellite program downlink receiver connected to the dish and the feedhorn for tuning particular programs according to channel and time of day, the improvement comprising at each earth receiving station:

a message broadcast receiver connected to control said dish, said feedhorn, and said satellite program downlink receiver and tuned to receive a plurality of broadcast control messages for a group of more than one earth receiving station, wherein said control messages each comprise instructions for the positioning of the dish, the setup of said feedhorn, the selection of said program channel, and the selection of a time-of-day for execution of said instructions by the dish, said feedhorn, and the satellite program downlink receiver.

2. The system of claim 1, further comprising:

a message broadcast transmitter connected to communicate said control messages by radio to a plurality of message broadcast receivers with the same control message being sent to each message broadcast receiver; and program manager means for coordinating said programs being uplinked with said control messages being separately broadcast by radio.

3. The system of claim 2, wherein:

the message broadcast receiver includes a personal pager receiver; and the message broadcast transmitter includes a corresponding personal pager transmitter.

4. The system of claim 1, wherein:

the message broadcast receiver includes message quality means for checking control message integrity, reliability and latency, wherein means are provided for eliminating duplicate control messages and for correcting corrupted control messages.

\* \* \* \* \*